Patented Nov. 21, 1933

1,935,930

UNITED STATES PATENT OFFICE 1,935,930

DERIVATIVES OF 2.3-HYDROXYNAPHTHOIC ACID ARYLIDES

Arthur Zitscher, Offenbach-on-the-Main, Heinrich Morschel, Cologne-Deutz, and Wilhelm Luce, Hofheim-on-Taunus, Germany, assignors to General Aniline Works, Inc., New York, N. Y., a corporation of Delaware No Drawing. Application December 19, 1931, Serial No. 582,178, and in Germany December 27, 1930

9 Claims. (Cl. 260—124)

The present invention relates to new derivatives of 2.3-hydroxynaphthoic acid arylides, more particularly it relates to compounds of the following general formula:

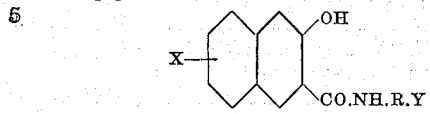

wherein X stands for an alkoxy- or alkylthio-group, R represents a radical of the benzene or naphthalene series and Y stands for hydrogen or the radical of the following formula:

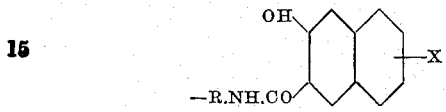

wherein X and R have the above mentioned meaning.

We have found that derivatives of 2.3-hydroxynaphthoic acid arylides are obtainable by condensing with a primary or secondary arylamine an alkoxy or alkylthio derivative of 2.3-hydroxynaphthoic acid which contains the alkoxy- or alkylthio-group in the non-carboxylated portion of the nucleus and thus transforming it into the corresponding arylide.

The new derivatives which are valuable for tinctorial purposes dissolve in high-boiling organic solvents and with a yellow color in caustic soda solution like the ordinary 2.3-hydroxynaphthoic acid arylides. In comparison with the hitherto known 2.3-hydroxynaphthoic acid arylides the new derivatives are partially distinguished by a greater affinity for the cotton fiber, the 7-alkoxy-2.3-hydroxynaphthoic acid arylides, for instance, have a higher substantivity than the corresponding 2.3-hydroxynaphthoic acid arylides.

The alkoxy derivatives of 2.3-hydroxynaphthoic acid which contain an alkoxy-group in the non-carboxylated nucleus are obtainable by mono-alkylating a derivative of 2.3-hydroxynaphthoic acid containing a hydroxy group as a substituent in the non-carboxylated nucleus. The alkylthio derivatives of 2.3-hydroxynaphthoic acid which contain an alkylthio-group in the non-carboxylated nucleus may be obtained by causing carbon dioxide under pressure and at elevated temperature to act upon the alkali salts of alkylthio derivatives of β-naphthol or upon the free naphthols in the presence of alkali carbonates.

The following examples serve to illustrate the invention, but they are not intended to limit it thereto, the parts being by weight:

(1) 218 parts of 6-methoxy-2.3-hydroxynaphthoic acid are heated together with 123 parts of 4-methoxy-1-aminobenzene and 1500 parts of toluene to 65° C. to 70° C. To this mixture there are added in the course of 1 hour 70 parts of phosphorus trichloride, while stirring, and the whole is heated to boiling until hydrochloric acid is no longer evolved. The toluene is blown off by means of steam. The remaining 6-methoxy-2.3-hydroxynaphthoic acid - 4'- methoxy - 1'- anilide can be purified in the usual manner by re-precipitating it from caustic soda solution. After recrystallization from glacial acetic acid, it melts at 254° C.

The arylide has the following formula:

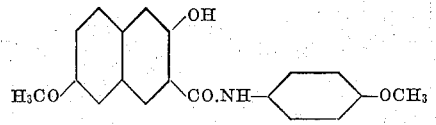

(2) 218 parts of 7-methoxy-2.3-hydroxynaphthoic acid are mixed with 1000 parts of toluene. The mixture is heated to boiling and 120 parts of thionyl chloride are added thereto, while well stirring. 130 parts of para-chloraniline are added to the solution thus obtained and the whole is boiled for about 5 hours while well stirring, until hydrochloric acid is no longer evolved. The toluene is blown off by means of steam and the 7 - methoxy - 2.3-hydroxynaphthoic-acid-4'-chloro-1'-anilide is filtered by suction. In order to purify the anilide from a small quantity of 7-methoxy-2.3-hydroxynaphthoic acid which may be present, it may be boiled with a solution of sodium carbonate. After recrystallization from glacial acetic acid, it melts at 273° C.

(3) 232 parts of 6-ethoxy-2.3-hydroxynaphthoic acid are stirred into 2300 parts of toluene, 102 parts of aniline are introduced into this mixture and 69 parts of phosphorus trichloride are added drop by drop at 80° C. The whole is heated to boiling until the evolution of hydrochloric acid is finished. After cooling, sodium carbonate is added and the excess of aniline and the toluene are blown off by means of steam. The precipitated 6-ethoxy-2.3-hydroxynaphthoic-acid-anilide is filtered by suction and washed with water. After recrystallization from glacial acetic acid, it melts at 215° C.

In the same manner, there is obtained the 8-ethoxy-2.3-hydroxynaphthoic acid anilide, melting after recrystallization from glacial acetic acid at 172° C.

(4) 234 parts of 6-methylthio-2.3-hydroxynaphthoic acid, 103 parts of aniline and 1500 parts of toluene are heated to 70° C. To this mixture, there are added in the course of one hour 70 parts of phosphorus trichloride while stirring whereafter the whole is heated to boiling until hydrochloric acid is no longer evolved. After addition of sodium carbonate, the toluene and the excess of aniline are blown off by means of steam and the 6-methylthio-2.3-hydroxynaphthoic-acid-anilide is filtered by suction. After recrystallization from dichlorobenzene, the anilide melts at 225° C. to 226° C.

In the same manner, there is obtained the 6-methylthio-2.3-hydroxynaphthoic-acid-o-toluidide melting after recrystallization from glacial acetic acid at 188° C. and the 6-methylthio-2.3-hydroxynaphthoic-acid-o-anisidide melting after recrystallization from glacial acetic acid at 142° C.

(5) 218 parts of 6-methoxy-2.3-hydroxynaphthoic acid are heated to boiling, while stirring, together with 122 parts of o-dianisidine and 1000 parts of xylene, whereafter the whole is allowed to cool to 70° C. To this mixture, there are added in the course of 1 hour 70 parts of phosphorus trichloride, while stirring, and the whole is heated to boiling until hydrochloric acid is no longer evolved. The strongly yellow arylide is filtered by suction and may be purified by washing it with benzene and alcohol. By quickly heating, it melts at about 300° C. with decomposition. The arylide has the following formula:

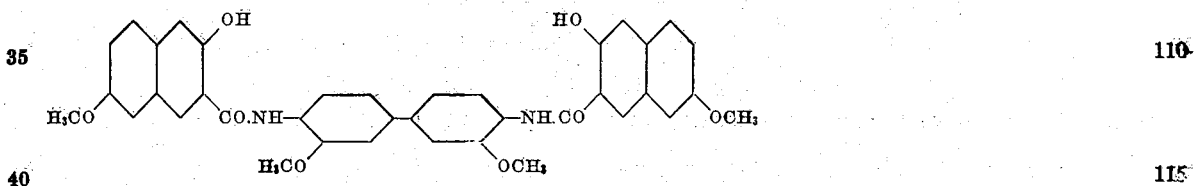

In a manner similar to those mentioned in the preceding examples, the 5-alkoxy-2.3-hydroxynaphthoic-acid-arylides are obtainable.

In order to characterize the new compounds, the following table is given which indicates the melting points of some of the new compounds:

| Compound | Melting point |
|---|---|
| 8-methoxy-2.3-hydroxynaphthoic-acid-anilide | 230° C. |
| 7-methoxy-2.3-hydroxynaphthoic-acid-anilide | 248° C. |
| 6-methoxy-2.3-hydroxynaphthoic-acid-anilide | 226° C. |
| 6-methoxy-2.3-hydroxynaphthoic-acid-2'-methyl-1-anilide | 205° C. |
| 7-methoxy-2.3-hydroxynaphthoic-acid-2'-methyl-1-anilide | 210° C. |
| 6-methoxy-2.3-hydroxynaphthoic-acid-3'-methyl-1'-anilide | 201° C. |
| 6-methoxy-2.3-hydroxynaphthoic-acid-4'-methyl-1'-anilide | 238° C. |
| 7-methoxy-2.3-hydroxynaphthoic-acid-4'-methyl-1'-anilide | 250° C. |
| 8-methoxy-2.3-hydroxynaphthoic-acid-4'-methyl-1'-anilide | 235° C. |
| 6-methoxy-2.3-hydroxynaphthoic-acid-2'5'-dimethyl-1'-anilide | 209° C. |
| 6-methoxy-2.3-hydroxynaphthoic-acid-2'6'-dimethyl-1'-anilide | 218° C. |
| 6-methoxy-2.3-hydroxynaphthoic-acid-2'-chloro-1'-anilide | 228° C. |
| 6-methoxy-2.3-hydroxynaphthoic-acid-3'-chloro-1'-anilide | 230° C. |
| 6-methoxy-2.3-hydroxynaphthoic-acid-4'-chloro-1'-anilide | 255° C. |
| 7-methoxy-2.3-hydroxynaphthoic-acid-4'-chloro-1'-anilide | 273° C. |
| 6-methoxy-2.3-hydroxynaphthoic-acid-4'-chloro-2'-methylanilide | 237° C. |
| 7-methoxy-2.3-hydroxynaphthoic-acid-4'-chloro-2'-methylanilide | 253° C. |
| 6-methoxy-2.3-hydroxynaphthoic-acid-2'5'-dichloroanilide | 215° C. |
| 6-methoxy-2.3-hydroxynaphthoic-acid-2'-methoxy-1'-anilide | 195° C. |
| 7-methoxy-2.3-hydroxynaphthoic-acid-2'-methoxy-1'-anilide | 190° C. |
| 6-methoxy-2.3-hydroxynaphthoic-acid-3'-methoxy-1'-anilide | 192° C. |
| 6-methoxy-2.3-hydroxynaphthoic-acid-4'-methoxy-1'-anilide | 254° C. |
| 7-methoxy-2.3-hydroxynaphthoic-acid-4'-methoxy-1'-anilide | 253° C. |
| 6-methoxy-2.3-hydroxynaphthoic-acid-2'-methyl-4'-methoxy-1'-anilide | 208° C. |
| 6-methoxy-2.3-hydroxynaphthoic-acid-2'-methyl-5'-methoxy-1'-anilide | 198° C. |
| 6-methoxy-2.3-hydroxynaphthoic-acid-4'-chloro-2'-methoxy-1'-anilide | 206° C. |
| 6-methoxy-2.3-hydroxynaphthoic-acid-2'5'-dimethoxy-1'-anilide | 198° C. |
| 7-methoxy-2.3-hydroxynaphthoic-acid-2'5'-dimethoxy-1'-anilide | 187° C. |
| 6-methoxy-2.3-hydroxynaphthoic-acid-1'-naphthylamide | 205° C. |
| 6-methoxy-2.3-hydroxynaphthoic-acid-4'-methoxy-1'-naphthylamide | 262° C. |
| 7-methoxy-2.3-hydroxynaphthoic-acid-1'-naphthylamide | 228° C. |
| 6-methoxy-2.3-hydroxynaphthoic-acid-2'-naphthylamide | 244° C. |
| 7-methoxy-2.3-hydroxynaphthoic-acid-2'-naphthylamide | 263° C. |
| 7-methylthio-2.3-hydroxynaphthoic-acid-2'-methoxy-1'-anilide | 164° C. |
| 7-methylthio-2.3-hydroxynaphthoic-acid-2'-methyl-4'-methoxy-1'-anilide | 214° C. |

We claim:

1. The compounds of the following general formula:

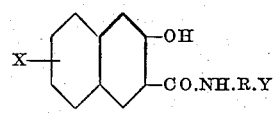

wherein X stands for an alkoxy- or alkylthio-group, R represents a radical of the benzene or naphthalene series and Y stands for hydrogen or the radical of the following formula:

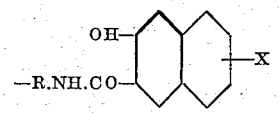

wherein X and R have the above mentioned meaning, being crystallized compounds soluble in high-boiling organic solvents and with a yellow color in caustic soda solution.

2. The compounds of the following general formula:

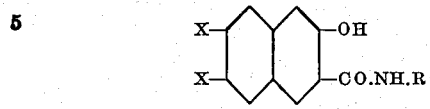

wherein one X stands for an alkoxy- or alkylthio-group, the other X stands for hydrogen and R represents a radical of the benzene or naphthalene series, being crystallized compounds soluble in high-boiling organic solvents and with a yellow color in caustic soda solution.

3. The compounds of the following general formula:

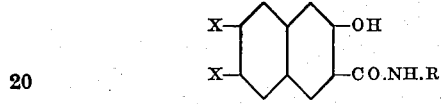

wherein one X stands for a methoxy- or methylthio-group, the other X stands for hydrogen and R represents a radical of the benzene or naphthalene series, being crystallized compounds soluble in high-boiling organic solvents and with a yellow color in caustic soda solution.

4. The compounds of the following general formula:

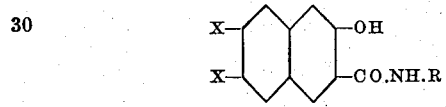

wherein one X stands for a methoxy-group, the other X stands for hydrogen and R represents a radical of the benzene or naphthalene series, being crystallized compounds soluble in high-boiling organic solvents and with a yellow color in caustic soda solution.

5. The compounds of the following general formula:

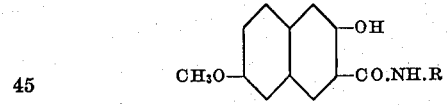

wherein R represents a radical of the benzene series, being crystallized compounds soluble in high-boiling organic solvents and with a yellow color in caustic soda solution.

6. The compounds of the following general formula:

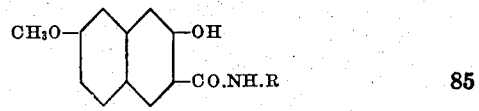

wherein R represents a radical of the benzene series, being crystallized compounds soluble in high-boiling organic solvents and with a yellow color in caustic soda solution.

7. The compound of the following formula:

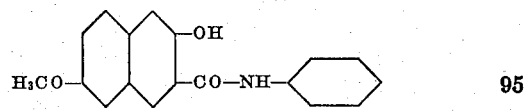

being a crystallized compound which melts at 226° C.

8. The compound of the following formula:

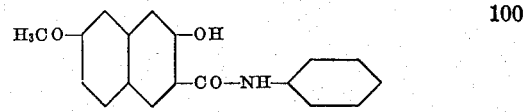

being a crystallized compound which melts at 248° C.

9. The compound of the following formula:

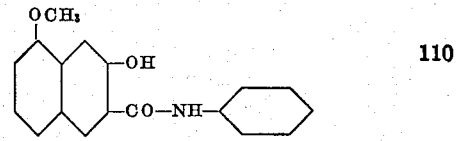

being a crystallized compound which melts at 230° C.

ARTHUR ZITSCHER.
HEINRICH MORSCHEL.
WILHELM LUCE.